UNITED STATES PATENT OFFICE.

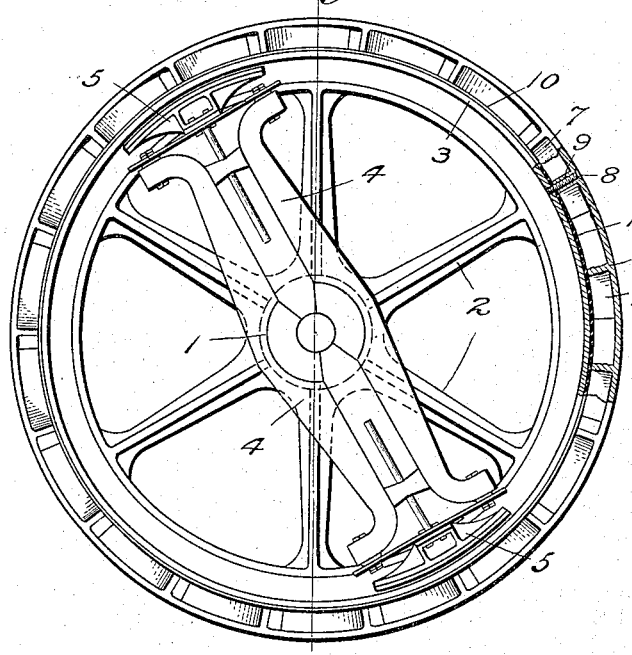
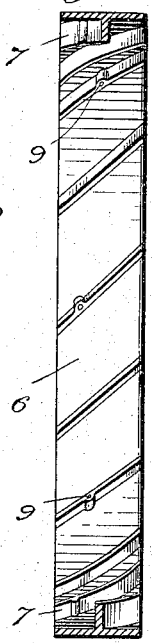
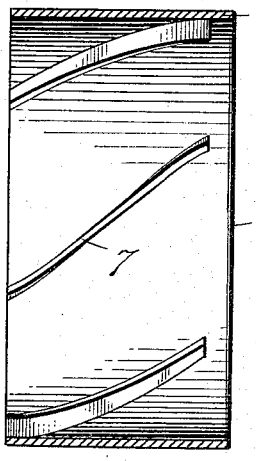
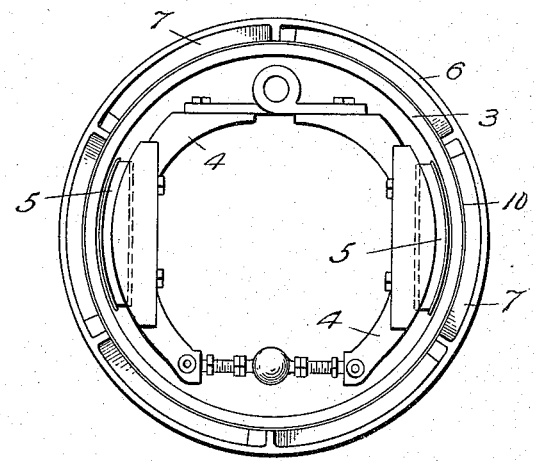

HENRY SCHERER, OF BILLINGS, MONTANA.

AIR-COOLED RIM FOR PULLEYS.

1,174,357.  Specification of Letters Patent.  Patented Mar. 7, 1916.

Application filed February 4, 1914. Serial No. 816,481.

*To all whom it may concern:*

Be it known that I, HENRY SCHERER, a citizen of the United States, residing at Billings, in the county of Yellowstone and State of Montana, have invented new and useful Improvements in Air-Cooled Rims for Pulleys, of which the following is a specification.

This invention relates to pulleys and pulley rims and has for its object to produce a device, which may be attached to any pulley wheel on the rim thereof, and which will provide positive cooling means therefor.

One object of the invention is to provide positive cooling means for clutch or other frictionally operated pulleys, whereby the heat from the engaging surfaces is prevented from coming into contact with the pulley belt.

Another object of the invention is to provide a supplemental rim for pulley wheels which may be attached to any pulley.

A further object is to provide a new method of insulating the pulley belt and the supplemental rim from the heat generated by the frictional clutch pulley.

It has long been a recognized fact that the life of pulley belts has been shortened to a marked degree by the heat generated in the working parts of the pulley as well as by the heat generated between the belt and the pulley rim. This has been noticed especially where the pulley in use was a clutch pulley or where a friction clutch operated within a pulley rim and a belt travels on the outside of the same rim. The heat so generated attacks the composition of the belt, acting in several different ways to reduce the life of the same. By the attachment of my device the heat so generated is disseminated and not allowed to come into contact with the belt.

The invention consists in a novel construction of the parts described and claimed in the accompanying specification and claims and illustrated in the drawings.

In the drawings: Figure 1 is a face view of a centrifugal drive pulley provided with my supplemental rim attached to the pulley rim, the portion broken away illustrating in section the insulating layer and the fastening bolts. Fig. 2 is an edge view showing in dotted lines the relative position of the vanes, hub, spokes and pulley rim with the supplemental rim attached. Fig. 3 is a view of the inner face of the supplemental rim, showing the vanes and holes provided for the fastening bolts. Figs. 4 and 5 illustrate the invention as applied to a spindle pulley of the centrifugal type.

1 represents the hub of any centrifugal friction clutch pulley and 2 represents the spokes thereof terminating in the pulley rim 3. The arms 4 of the clutch are shown mounted within the pulley and provided with the friction shoes 5, which are arranged to operate against the inner face of the rim 3 when the parts are rotated. The supplemental rim 6 is a steel casting provided with the vanes or fan blades 7, preferably cast integral therewith, and placed at the proper angle to draw the largest quantity of air through the rim 6. This rim may be cast in one piece and may be of any size desired or it may be cut through at one side to allow for fitting to the pulley rim. The supplemental rim 6 is slipped over the pulley rim 3 and fastened thereto by the set screws 8 countersunk in the outer rim. These screws or bolts pass through the supplemental rim and into the surface of the rim 3, care being observed that they do not extend all the way through and interfere with the clutch action.

It will be noticed that enlargement in the vanes 7 are provided for the holes 9 of the screws 8 and that the latter are placed in staggered relation to give additional strength to the structure. This form is preferred but the bolts or screws could pass through the space between the vanes without departing from the spirit of the invention. To further guard against the heating of the supplemental rim 6 I place a ring 10 of some heat insulating material between the rim 3 and the vanes 7. This insulation will be permanently held in place by the binding action of the vanes 7 and bolts 8. While it is not necessary to have insulating material 10 formed in a ring, since a small portion between the vanes and the pulley rim would serve as insulation, still this has been shown to be the most satisfactory construction, removing all radiating surfaces and providing the greatest strength.

This structure may be used in combination with any expanding brake drum where it is desirable to prevent the heating of the parts.

From the foregoing it will be clear that I have provided a new and practical device for use on any pulley wheel and especially designed to form a working part with any internally expanding brake or clutch mechanism in which the outer member engages the belt.

Changes may be made in form and proportion of the parts without departing from the scope of the invention.

Having described my invention, what I claim as new and desire to secure by Letters Patent is:

1. A supplemental rim for pulleys provided with inclined fan blades on its inner surface and fastening means for attaching said rim to pulleys, said fan blades being arranged at an angle to the plane of the rim.

2. In a pulley wheel, the combination with a main rim, of a supplemental rim removably secured to said pulley rim but spaced therefrom, inclined fan blades between said pulley rim and said supplemental rim, and fastening means securing said supplemental rim to said main rim.

3. In a pulley wheel the combination with a rim, of a clutch within said rim, a supplemental rim removably secured to said pulley rim but spaced therefrom, inclined fan blades spaced between said pulley rim and said supplemental rim, and fastening means passing through said supplemental rim and engaging said pulley rim.

4. In a pulley wheel the combination with a rim, of a clutch within said rim, a supplemental rim removably secured to said pulley rim but spaced therefrom, inclined fan blades spaced between said supplemental rim and said pulley rim, heat insulating material spaced between said fan blades and said pulley rim, and fastening means passing through said supplemental rim and insulating material to rigidly hold the same to said pulley rim.

5. In a pulley wheel, the combination with a rim, of a clutch within said rim, a supplemental rim removably secured to said pulley rim but spaced therefrom, inclined fan blades formed integrally with said supplemental rim on the inner surface of the same, heat insulating material spaced between said fan blades and said pulley rim, and a plurality of fastening means arranged in staggered relation to each other, passing through said supplemental rim to rigidly hold the same to said pulley rim.

6. In a pulley wheel, the combination with a rim, of a clutch within said rim, a supplemental rim removably secured to said pulley rim but spaced therefrom, fan blades formed integrally with said supplemental rim on the inner surface of the same, constituting spacing means between the supplemental rim and the pulley rim and inclined at an angle to the axis of the pulley, and fastening means to rigidly hold the supplemental rim to said pulley rim.

7. In a pulley wheel, the combination with an outer rim to be engaged by a belt, of an inner rim spaced from said outer rim, a clutch within and arranged to engage said inner rim, and inclined fan blades between said outer and inner rims constituting combined spacing means for said rims and cooling means to protect said outer rim from the heat effect of the engagement of said clutch with said inner rim.

In testimony whereof I affix my signature in presence of two witnesses.

HENRY SCHERER.

Witnesses:
A. H. BROWN,
E. S. COLEMAN.